United States Patent [19]

Berke et al.

[11] Patent Number: 4,896,956
[45] Date of Patent: Jan. 30, 1990

[54] SPECTACLES WITH SINGLE PIVOT FOLDED REAR VISION ELEMENTS

[75] Inventors: Joseph J. Berke, 2063 Long Lake Shore, West Bloomfield, Mich. 48033; A. Gil Spear, Jr., Vero Beach, Fla.

[73] Assignee: Joseph J. Berke, West Bloomfield, Mich.

[21] Appl. No.: 243,871

[22] Filed: Sep. 13, 1988

[51] Int. Cl.$^4$ ............................................. G02C 11/02
[52] U.S. Cl. .................................................. 351/50
[58] Field of Search .................. 350/638; 351/158, 50

[56] References Cited

U.S. PATENT DOCUMENTS 1,080,893 12/1913 Collier .
1,691,789 11/1928 Teiber .
2,176,167 10/1939 Comstock .
4,349,246 9/1982 Binner .

FOREIGN PATENT DOCUMENTS 861310 10/1940 France ................................... 351/50
112124 5/1986 Japan .................................... 351/50
642912 9/1950 United Kingdom .................. 351/50

*Primary Examiner*—Rodney B. Bovernick
*Attorney, Agent, or Firm*—Alex Rhodes

[57] ABSTRACT

A fashionable pair of spectacles with single pivot folded rear vision elements for viewing objects behind a forward facing user. The spectacles are comprised of a binocular eyepiece of the kind having a conventional frame without side shields, a pair of spaced apart slender temples mounted to opposite ends of the eyepiece for rotation about a first pair of vertical axes and a pair of spaced apart folded elements mounted to the eyepiece for rotation about a second pair of vertical axes which are positioned inside of the first pair of axes. Each rear vision element has a reflective portion and a mounting portion at a fixed angular relationship to the reflective portion. The elements are independently selectively adjustable about the second set of axes to operative positions for viewing objects behind the wearer whereat the reflective portions are forward of the eyepiece in plain view without restriction to the side vision of the user and to non-operative stored positions whereat the reflective portions are in side facing relationship to the user. When the elements are at their non-operative stored positions the appearance of the spectacles is conventional and the folded elements are not readily discernible as separate elements of the spectacles.

5 Claims, 1 Drawing Sheet

U.S. Patent
Jan. 30, 1990
4,896,956
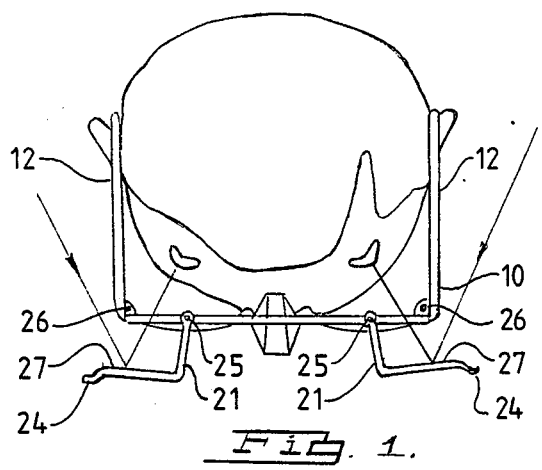
Fig. 1.
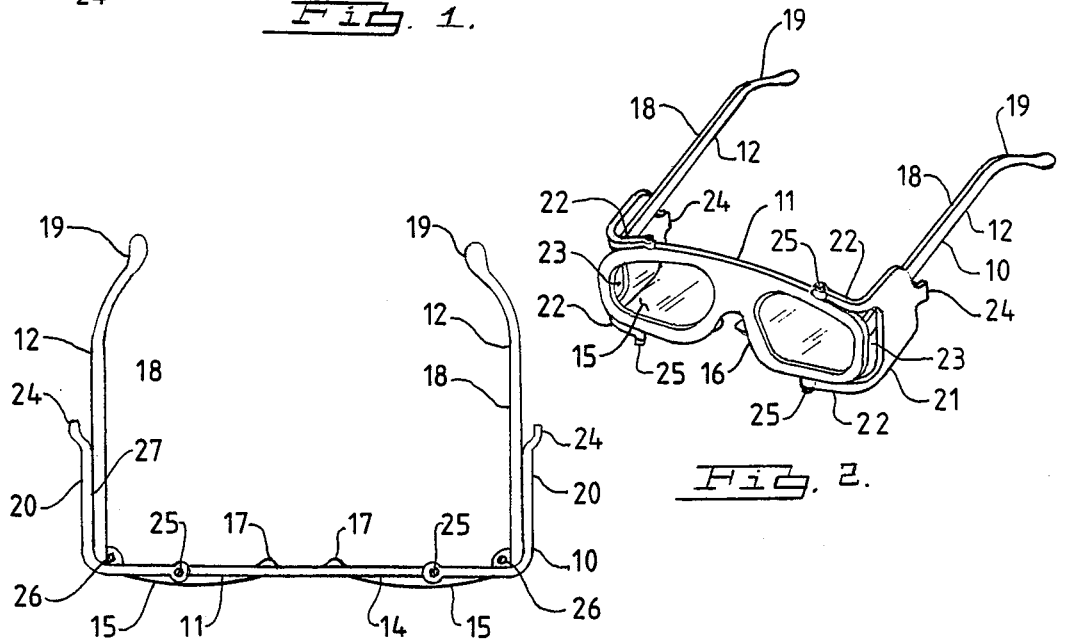
Fig. 2.
Fig. 3.
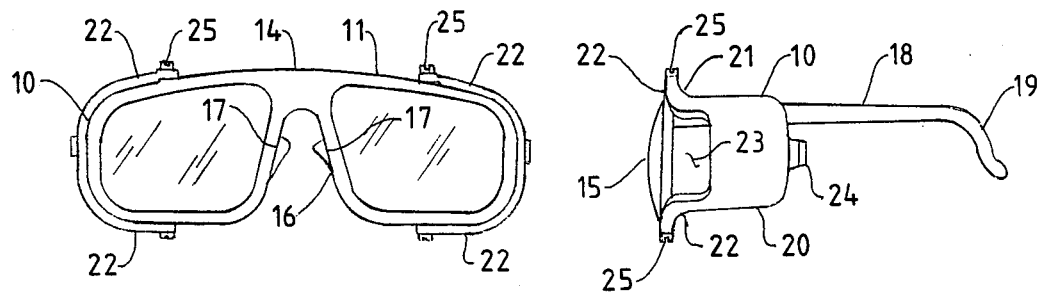
Fig. 4.
Fig. 5.

SPECTACLES WITH SINGLE PIVOT FOLDED REAR VISION ELEMENTS

BACKGROUND OF THE INVENTION

When danger threatens, the ability to view objects at the rear would enhance the safety of motorists, motorcyclists, bicyclists, joggers, industrial workers, servicemen, policemen, pedestrians and the like. Viewing objects at the rear would also amuse and entertain many consumers. Although rear vision spectacles would serve these ends, prior concepts have neither gained the public's favor nor achieved a modicum of success in the market.

The reasons rear vision spectacles have not been successful are that they have been unsightly and functionally deficient. It is needless to say that spectacles are perceived by the public as articles of fashion as well as devices for improving vision. Most consumers refuse to accept articles of adornment which detract from their appearance or make them conspicuous to others. Thus, to be accepted by the public, spectacles need to be attractive as well as functionally effective. Heretofore, rear vision spectacles have not satisfied this need.

Prior concepts have also have been difficult to use and deficient in performance. Consumers will not accept products which do not perform satisfactorily or require inordinate amounts of time to adjust before using. Still yet another reason is that they have not been adaptable for storage in conventional type eyeglass cases. To be accepted, rear vision spectacles must be easy to use, effective and preferably adaptable for storage in conventional type eyeglass oases.

The deficiencies of the prior art are exemplified by Comstock U.S. Pat. No. 2,176,167, Binner U.S. Pat. No. 4,349,246 and Teiber U.S. Pat. No. 1,691,789. Comstock discloses an unsightly pair of spectacles of limited performance with detachable crescent shaped mirrors cantilevered outwardly from opposite lower end portions of the spectacles frame.

Binner discloses an unsightly pair of spectacles with a large single detachable circular mirror cantilevered outwardly from the spectacles' frame. Teiber discloses an unsightly pair of spectacles with mirrors rotatably mounted to fixed arms which project forwardly from the ends of the spectacles. The arms obstruct a user's frontal field of vison and cannot be retracted when the spectacles are not in use.

From the foregoing, it will be appreciated that an attractive, economical, easy to use and effective pair of rear vision spectacles would satisfy an existing need and provide benefits heretofore unavailable.

SUMMARY OF THE INVENTION

The present invention is directed toward spectacles and more particularly to a pair of spectacles with single pivot reflective elements which enable a forward facing user to observe objects at the rear. The invention comprises an eyepiece, a pair of temples mounted to opposite ends of the eyepiece which are rotatable about a first pair of vertical axes and a pair of spaced apart folded elements mounted to the eyepiece for rotation about a second pair of vertical axes which are inward of the first pair of axes.

Each of the rear vision elements has a reflective portion and an adjoining mounting portion at a fixed angular relationship to the reflective portion. The elements are independently selectively adjustable about the second set of axes to operative positions whereat reflective surfaces confront the user at a position which is substantially forward of the eyepiece and to a non-operative position whereat the reflective portions are aligned with the adjacent temples. When the rear vision elements are at their non-operative positions, the spectacles have a conventional appearance and the rear vision elements are not readily discernible as separate elements of the spectacles.

It is a primary object of the invention to provide a fashionable, yet effective and easy to use pair of rear vision spectacles for the safety and entertainment of their users.

One feature of the invention is that the ornamental design of the rear vision elements is integrated into the overall design of the spectacles. Thus, the basic styling of the spectacles is preserved.

Another feature is that the rear vision elements are individually adjustable to vary the user's field of rear vision.

Another feature is that the user's forward field of vision is only minimally obstructed when the rear vision elements are at their operative positions.

Another feature is that the spectacles can be folded into a compact arrangement for storage in a conventional type eyeglass case.

Additional features, benefits and objects of the invention will become apparent from the ensuing description an accompanying drawings which describe the invention in detail. A preferred embodiment and the manner of using the same are disclosed in accordance with the best mode contemplated in practicing the invention and the subject matter in which exclusive property rights are claimed is set forth in each of the numbered claims at the conclusion of the detailed description of the invention.

BRIEF DESCRIPTION OF THE DRAWINGS

FIG. 1 is a plan view of a person with a pair of spectacles having a pair of single pivot rear vision elements with the elements in their operative positions for observing objects at the rear.

FIG. 2 is a perspective view of the spectacles of FIG. 1 showing the single pivot rear vision elements in their non-operative positions.

FIG. 3 is a plan view of the spectacles shown in FIGS. 1 and 2 with the rear vision elements in their non-operative positions.

FIG. 4 is a front view of the spectacles shown in FIG. 3.

FIG. 5 is a left side view of the spectacles shown in FIG. 3.

DETAILED DESCRIPTION OF THE PREFERRED EMBODIMENT

Referring now to the drawings, wherein like numerals designate like and corresponding parts throughout the several views, the embodiment disclosed in FIGS. 1 through 5, inclusive, for purposes of illustrating the invention, comprises a binocular eyepiece 11; a pair of symmetrically opposite temples 12 mounted to opposite end portions of the eyepiece 11 which are rotatable about a first pair of spaced apart vertical axes; and a pair of symmetrically opposite rear vision elements is mounted to the eyepiece between the temples 12 which are rotatable about a second pair of spaced apart vertical axes.

The appearance of the spectacles 10 is conventional and in accord with stYling which is familiar to the public. The eyepiece 11 has a frame 14 and a pair of lenses 15 mounted in the frame 14. The lenses 15 may be refractive type lenses 15 for correcting a user's vision and/or tinted lenses 15, commonly used in sun glasses. The center portion of the eyepiece frame 14 has an upward extending recess 16 which forms a bridge for mounting the eyepiece 11 on the user's nose and at the sides of the recess 16 are integral nose pads 17.

The temples 12 have straight horizontal front portions 18 which extend rearward from the attachments 26 of the temples 12 to the eyepiece frame 14 and have adjoining arcuate rear portions 19 which support the temples 12 on the user's ears.

The single pivot elements 13 are attached to top and bottom portions of the eyepiece frame 14, between the upward-extending center recess 16 and the attachments 26 of t he temples 12, for rotation about a second pair of vertical axes. The rear vision element 13 which can be described as bent or folded is comprised of a reflective portion 20 having a reflective surface 27 which confronts a user in the operative position of the element 13 and an adjoining mounting portion 21 at a fixed angular relationship to the reflective portion 20.

The design of the mounting portion 21 is best understood by reference to FIGS. 2 and 5. The mounting portion 21 is comprised of a pair of slender horizontal spaced apart arms 22 which are rotatably attached at the front end portions to the top and bottom portions of the eYepiece frame 14. The rear end portions of the arms 22 adjoin the reflective portions 20 of the elements 13. When the elements 13 are at their operative positions, the open space 23 between the arms 22 serves as a window 23 through which the elements 13 are visible to the user. The mounting portion 21 may also be a transparent portion without a window (not shown) for viewing the reflective portion 20.

Although the reflective portion 20 is large in area to maximize the rearward field of vision, its size and shape are in harmony with the appearance of the eyepiece frame 14 and the temples 12 so that when a rear vision element 13 is at its retracted non-operatve position adjacent to a temple 12, the element 13 will not detract from the overall appearance of the spectacles 10 or be readily discernible as a separate element of the spectacles 10. The end portion of the reflective portion 20 is preferably a small tab 24 for grasping and rotating the element 13 outwardly to its operative position and inwardly to its retracted position.

The operative positions of the rear vision elements 13, are shown in FIG. 1. At the operative positions the mounting portions 21 of the elements 13 extend forward of their attachments 25 to the eyepiece 11, the adjoining reflective portions 20 are positioned substantially forward of the eyepiece 11 and reflective surfaces 27 of the elements 13 are in clear view of the user through the eyepiece lenses 15 and windows 23.

The non-operative positions of the elements 13 are shown in FIGS. 2 and 5. At these positions, the mounting portions 21 are aligned with the eyepiece frame 14 and the reflective portions 20 are aligned with the temples 12. When the spectacles 10 are to be stored in a conventional type eyeglass case (not shown), the temples 12 and rear vision elements 13 are folded inwardly to rest against the eyepiece frame 14.

The manner of using the invention is as follows. When the rear vision elements 13 are not in use, they are retracted to the non-operative positions shown in FIG. 2, whereat the reflective portions 20 are aligned with the temples 12 and the mounting portions 21 are aligned with the spectacles' frame 14. When it is desired to observe objects at the rear, one or both elements 13 are rotated outwardly to their operative positions by grasping the finger tabs 24 and rotating the elements 13 about their vertical pivot axes. At the operative positions, the rearward field of vision of each element 13 is laterally adjusted by rotating the element 13 about its pivot axis or by rotating the user's head.

It will be appreciated that viewing of the elements 20 through refractive lenses 15 improves the rear vision of the user and reduces eyestrain by minimizing the lateral viewing angle of the user's eyes. When observing objects at the rear is no longer desired, the finger tabs 24 are again grasped by the user's fingers and the elements 13 rotated to the non-operative positions shown in FIG. 2.

From the foregoing, it will be appreciated that the present invention provides a fashionable, easy to use and effective pair of spectacles for enabling a forward facing user to observe objects at the rear. It will be further appreciated that the invention will entertain many of its users and will enhance the safety of persons exposed to danger, by way of example, motorists, motorcyclists, bicyclists, joggers, industrial workers, servicemen, and policemen.

Although only two embodiments of our invention have been described, it will be understood that other embodiments can be provided by changes in the material, size, shape and arrangement of parts without departing from the spirit thereof.

We claim:

1. A pair of spectacles for viewing objects behind a forward facing user of the kind having a pair of slender temples rotatably attached to the ends of a conventional eyeglass frame without side shields whereby the side vision of the user of the spectacles is unobstructed by the frame, comprising, in combination: an eyepiece, a conventional eyeglass frame without side shields, a pair of symmetrically opposite slender temples attached to the opposite outer end portions of the frame for rotation about a pair of spaced apart axes, a pair of lenses mounted in the frame, at least one folded rear vision element attached to the eyepiece at a position which is laterally intermediate to the ends of the frame, said rear vision element having a window bounded by a pair of spaced apart arms rotatably attached to the upper and lower intermediate portions of said frame to enable the user through the window between said arms to view objects at the side of the user without obstruction and an adjoining reflective portion at a fixed angular relationship to said arms to enable the user through said lenses to view objects behind the user, said element being selectively adjustable about a single axis to an operative position whereat said reflective portion is in confronting relationship to a user of said spectacles and to a non-operative position whereat said reflective portion is in side facing relationship to the user.

2. The spectacles recited in claim 1 further comprising a second rear vision element attached to the eyepiece which is configured symmetrically opposite the first rear vision element.

3. The spectacles recited in claim 1 wherein said pair of lenses are refractive lenses.

4. The spectacles recited in claim 1 wherein said pair of lenses are tinted lenses.

5. In a pair of spectacles of the kind having a pair of slender temples rotatably attached to the ends of a conventional eyeglass frame without side shields whereby the side vision of the user of the spectacles is unobstructed by the frame, the improvement which comprises: a pair of symmetrically opposite folded rear vision elements rotatably attached to the upper and lower portions of the frame at positions which are laterally intermediate to the ends of the frame, said rear vision elements being comprised of a pair of spaced apart slender arms rotatably attached to said upper and lower portions of said frame to form windows between said arms to enable the user through said windows to view objects at the sides of the user without obstruction and adjoining reflective portions at a fixed angular relationship to said arms for enabling the user to view objects behind the user when said rear vision elements are selectively rotated to operative positions whereat said reflective portions are in confronting relationship to said user.

* * * * *